Inventor:
Adiel Y. Dodge,

Dec. 1, 1942.  A. Y. DODGE  2,303,829
TRANSMISSION
Filed July 13, 1939  3 Sheets-Sheet 3

Inventor:
Adiel Y. Dodge,
By McConkey Dawson & Booth
Attys

Patented Dec. 1, 1942

2,303,829

UNITED STATES PATENT OFFICE 2,303,829

TRANSMISSION

Adiel Y. Dodge, Rockford, Ill.

Application July 13, 1939, Serial No. 284,240

3 Claims. (Cl. 74—189.5)

This invention relates to transmissions and more particularly to infinitely variable hydraulic transmissions.

One of the objects of the invention is to provide a hydraulic transmission in which liquid is circulated through the hydraulic element by a pump driven thereby. According to one important feature the pump is a gear pump serving also as a part of the torque transmitting mechanism of the transmission.

Another object of the invention is to provide a hydraulic transmission in which driving liquid is maintained in the hydraulic unit under positive pressure. Preferably the liquid is pumped into the unit and is allowed to escape past a normally closed valve which opens in response to a predetermined pressure.

Still another object of the invention is to provide a hydraulic transmission having a positive displacement pump whose outlet may be restricted or closed to act as a brake. This is very advantageous for shifting gears, clutches or the like.

Other objects, advantages and novel features of the invention will be apparent from the following description when read in connection with the accompanying drawings, in which.

Figure 1:
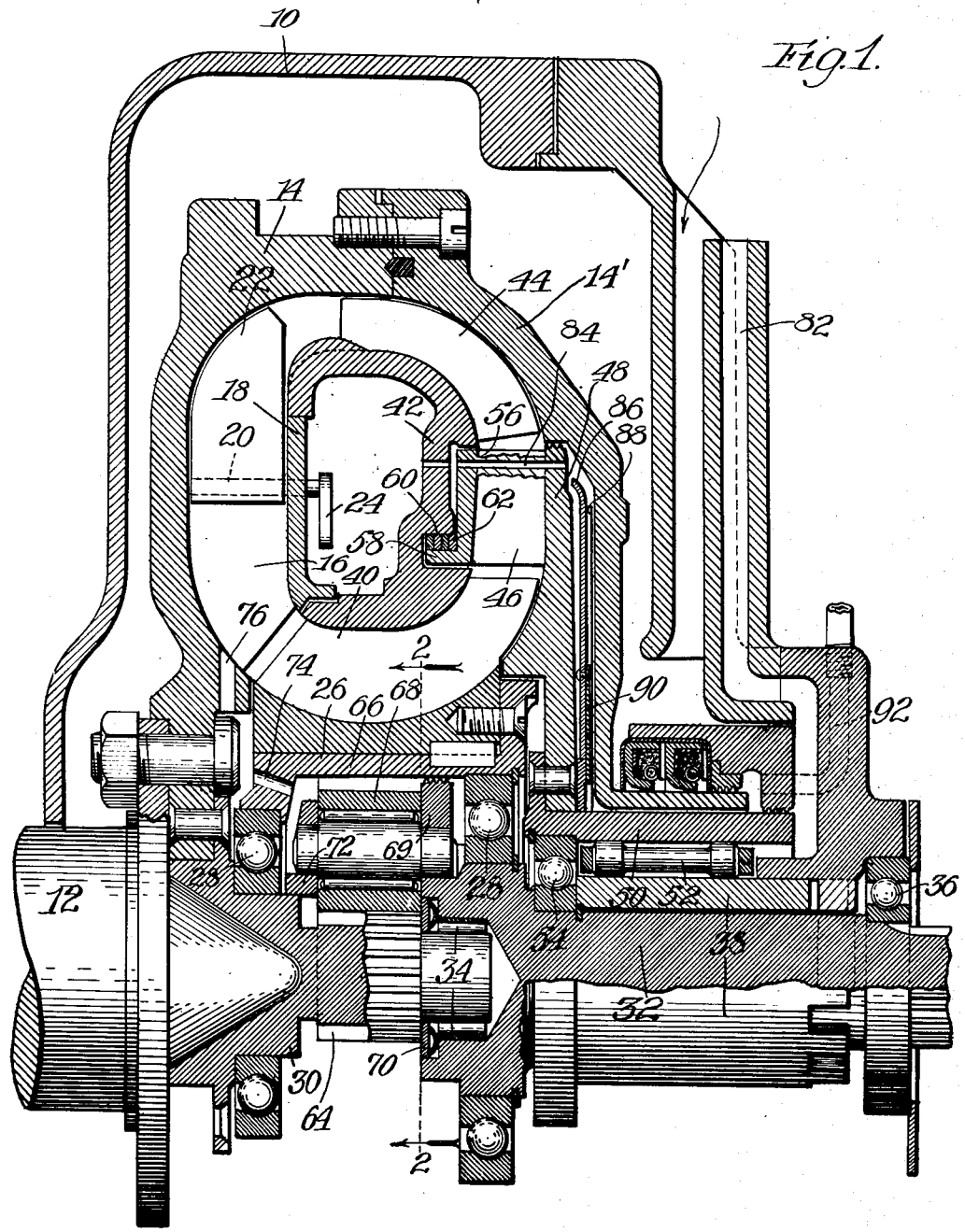
Figure 1 is a partial axial section through a transmission embodying the invention.
Figure 2:
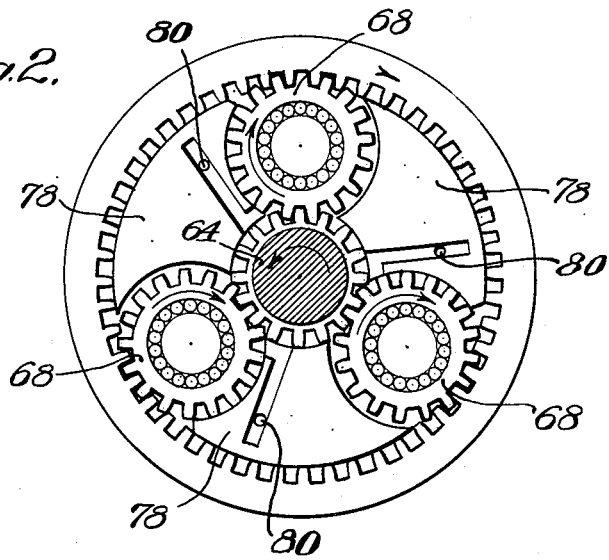
Figure 2 is a section on the line 2—2 of Figure 1.

The transmission of Figures 1 to 4 comprises a stationary casing 10 into which extends a driving shaft 12 which may be an engine crankshaft or a suitable extension thereof. The shaft 12 is connected to a hydraulic torque converter including a split impeller casing 14—14' carrying on its interior a set of fixed vanes 16 which in turn carry an annular core member 18. Pivot rods 20 are journaled in the casing 14 and core member 18 adjacent the outlet ends of vanes 16 and carry vanes 22. The vanes 22 are urged in one direction by liquid reaction thereon and in the opposite direction by centrifugal weights 24 secured to the rods 20 as is more fully described and claimed in my copending application Serial No. 3,544 filed January 26, 1935.

Inside the casing 14 there is rotatably mounted a rotor member having a hub 26 supported on bearings 28 on an extension 30 of the driving shaft and on a driven shaft 32 respectively. Preferably the extension 30 has a pilot bearing 34 in the end of the shaft 32, the shaft 32 being supported by a bearing 36 engaging the casing 10 and by a sleeve 38 secured thereto. The hub 26 carries a set of blades 40 which are secured at their inner edges to a core member 42 carrying a second set of rotor blades 44.

In the space between the two sets of rotor vanes 40 and 44 there is arranged a set of stator vanes 46 supported by a flange 48 on a hub 50 which is mounted on a combined one-way clutch and bearing 52 on the sleeve 38. The one-way clutch and bearing 52 may take the form particularly disclosed and claimed in my Patent No. 2,113,722. Preferably a bearing 54 is arranged between the shaft 32 and hub 50.

The inner edges of the stator vanes 46 are connected by an annular ring 56 fitting in a recess in the core 42 and having an axially extending flange 58 with its outer cylindrical surface spaced radially from a complementary surface 60 on the core 42. A clutch coil 62 is wrapped around the flange 58 and is secured at one end thereto with a slight clearance normally existing between the outer coil surface and the surface 60.

In normal operation during torque multiplication liquid leaves the rotor vanes 44 with a backward component and tends to turn the stator backwards. This is prevented by the one-way clutch 52 so that the stator is held stationary. As the rotor speeds up at lighter torque loads liquid leaves it with a forward component, striking the backs of the stator vanes and turning the stator forward to overrun the clutch 52. When a predetermined speed is reached the clutch coil 62 is expanded by centrifugal force into contact with the surface 60 and wraps internally against that surface to connect the stator and rotor. Thereafter, the coil 62 functions as a one-way clutch to prevent the stator from overrunning the rotor, the stator and rotor when connected serving as an integral rotor so that the device functions as an efficient fluid flywheel or clutch.

The transmission includes a differential gear set shown as comprising a sun gear 64 formed on the shaft extension 30 and an internal gear 66 formed on or secured to the hub 26. A plurality of planet gears 68 mesh with the gears 64 and 66 and are rotatably carried by a flanged carrier 69 on the driven shaft 32, the above named gears all being compactly arranged coaxially of the torque converter between planes defining the axial edges thereof. With this arrangement it will be seen that the driven shaft 32 is driven jointly by the sun gear 64 and the ring gear 66 through two parallel paths of power flow as more particularly described and claimed in my copending application Serial No. 723,083 filed April 30, 1934. The driven shaft may be connected directly or through any desired gearing or the like to a load to be driven such as the driving shaft of an automobile.

According to one important feature of the invention, the gears 64, 66 and 68 are arranged to form a gear pump to circulate liquid through the torque converter. For this purpose one end of the planet gear teeth is closed by the planet carrier flange 69 and by a spring pressed ring 70 and the inner portion at the opposite end is closed by a ring 72. Passages 74 and 76 in the hub 26 and in the casing 14 connect the portion of the last named end outside of ring 72 with the liquid circuit formed by the several vaned elements. The spaces between the gear elements are closed by blocks 78 closely fitting the teeth of gears 64, 66 and 68 and formed with axially extending inlet passages 80 opening into the teeth of planet gears 68 adjacent the sun gear 64. The passages 80 communicate with openings in the flange 69 to provide for ingress of liquid to the gears.

The passages 80 are preferably restricted relative to the pump outlet area so as to limit the supply of liquid circulated through the hydraulic unit. Since the restriction is on the pump inlet side the quantity of liquid is limited to the velocity caused by vacuum and the pump will tend to cavitate at high pump speeds.

Oil or other desired liquid is supplied through a passage 82 formed in the casing 10 from a supply or cooling reservoir, not shown, and flows past bearings 52, 54 and 28 and through the openings in flange 69 into the passages 80. With the gears rotating relatively in the direction of the arrows in Figure 2 the liquid will be picked up by gears 68 adjacent the sun gear and forced out axially to the left as seen in Figure 1 to flow through the passages 74 and 76 into the torque converter.

Figure 3:
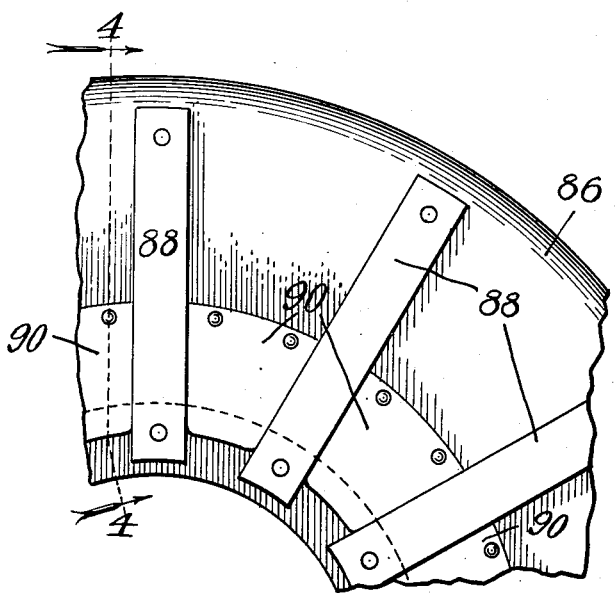
Figure 3 is a partial elevation of a detail.
Figure 4:
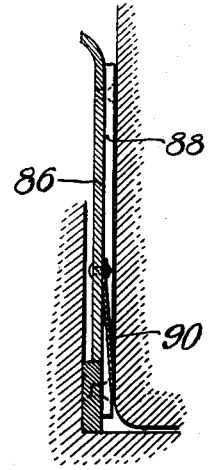
Figure 4 is an enlarged partial section on the line 4—4 of Figure 3.

Liquid flows out of the torque converter circuit through passages 84 and through radial passages formed between a plate 86 and the inner surface of the casing 14. As best seen in Figure 3 the plate 86 carries a plurality of radial spacer bars 88 which space it from the casing 14 to form therebetween a series of radial passages.

According to one important feature of the invention the liquid in the torque converter is maintained under a positive pressure to insure that the torque converter circuit will be kept full and to reduce vaporization. This effect is produced to a certain extent by the centrifugal resistance encountered in forcing the liquid inwardly between the plate 86 and casing 14 and is accentuated by providing a yielding outlet valve resisting outflow of liquid. As shown this valve comprises a plurality of spring plates 90 secured to the plate 86 and fitting between the radial bars 88. Normally the plates 90 spring out into contact with the housing 14 to close the spaces between the bars 88, the plate 86 and the housing. However, when the liquid in the torque converter reaches a predetermined pressure it forces the plates back and flows past them around the sleeve 50 and back to the reservoir or cooling means through a passage 92.

In operation the gears constantly circulate liquid through the torque converter so that it is always kept full and so that the liquid may be cooled if desired. The same liquid also serves as a lubricant for the several bearings through which it flows. When the transmission is stopped the valves 90 will close to keep it full of liquid.

Figure 5:
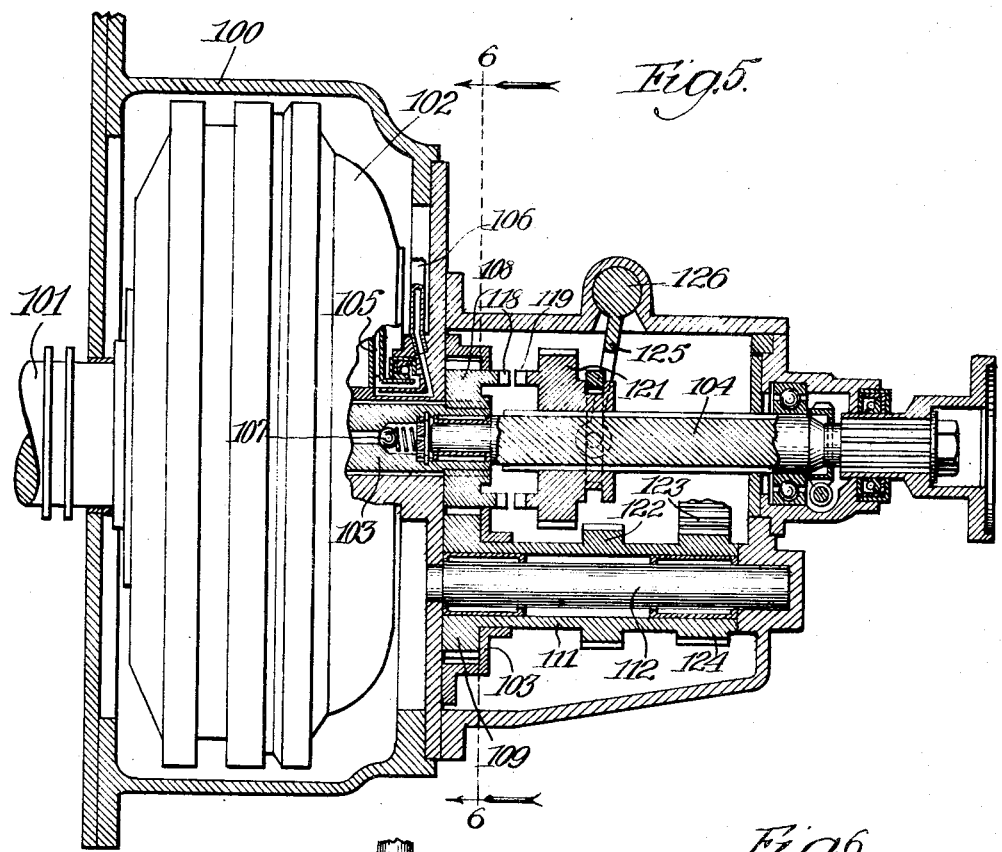
Figure 5 is an axial section with parts in elevation of another transmission embodying the invention.
Figure 6:
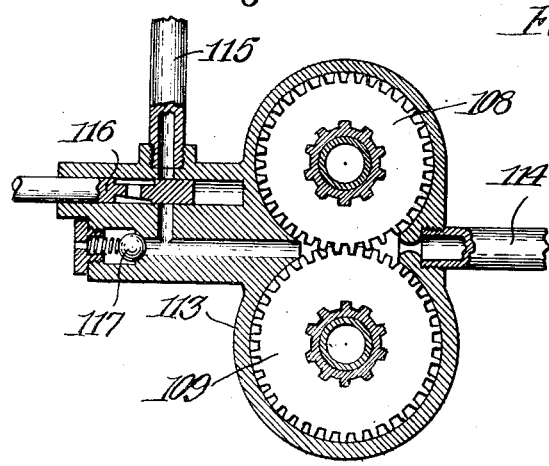
Figure 6 is a section on the line 6—6 of Figure 5.

Figures 5 and 6 illustrate a modified construction including a housing 100 having a driving shaft 101 extending through one end thereof and connected to a hydraulic torque converter 102 which may be the same as that described in connection with Figures 1 to 4.

The rotor of the torque converter is connected to a drilled shaft 103 in one end of which a driven shaft 104 is journaled. The torque converter includes a centrifugal pump 105 formed by a plate similar to plate 86 of Figure 1 for forcing liquid therethrough, the liquid being supplied through a pipe 106 from a feed pump to be described later and being forced out through the shaft 103 past a spring pressed check valve 107 and into the gear casing. The valve 107 functions in the same manner as the valve 90 of Figures 1 to 4 to permit circulation of liquid under pressure during operation and to prevent draining of liquid from the torque converter when it is stopped.

A spur gear 108 is splined to the end of the shaft 103 and is in constant mesh with a gear 109 fixed to a sleeve 111 journaled on a lay shaft 112 which is fixed in the housing 100. The gears 108 and 109 are enclosed about their peripheries by a casing 113 to form a gear pump having a restricted inlet pipe 114 which may lead from the lower part of the gear housing or from any other suitable source of liquid supply. The pump has an outlet 115 connected to the pipe 106 to supply liquid to the pump 105.

The passage 115 is controlled by a sliding valve 116 which may be operated by a pedal corresponding to the usual clutch pedal and when the valve 116 is closed resistance is imposed on the pump thus tending to brake the pump and consequently the rotor of the torque converter. In order to prevent damage due to building up of too much pressure should the valve 116 be closed when the gears are turning at a high speed, a relief valve 117 is provided in the passage 115 to yield under a predetermined pressure and by-pass liquid back to the source.

The gear 108 carries a set of clutch teeth 118 adapted to engage a set of clutch teeth 119 on a gear 121 which is slidably splined on the driven shaft. The gear 121 is also engageable with a gear 122 formed on the sleeve 111 and with an idler 123 meshing with a reverse gear 124 formed on the sleeve 111. The gear 121 may be shifted by a yoke 125 controlled by a shaft 126 which may be operated by any suitable shifting lever. The position shown is the neutral position in which there is no connection between the driving and driven shafts. If the gear 121 is shifted to engage the clutches 118 and 119 the shaft 103 and the rotor of the torque converter are connected directly to the driven shaft and the only torque multiplication is that produced in the torque converter and may vary from about 3.5 to 1 to 1 to 1. If the gear 121 is shifted into mesh with the gear 122, the drive is from the rotor of the pump 108 to gear 109 and through sleeve 111 to gear 122 and to gear 121 thus driving the driven shaft with a further mechanical torque multiplication.

When the gear 121 is shifted into mesh with the reverse idler 123 the driven shaft will be rotated in reverse with a torque multiplication equal to the product of that produced by the torque converter and that produced by the gear chain.

While only two embodiments of the invention have been shown and described, it will be apparent that many changes might be made therein and it is not intended to be limited to the forms shown or otherwise than by the terms of the appended claims.

This application is a continuation in part of my prior application Ser. No. 44,848, filed October 14, 1935, now matured into Patent No. 2,196,660 issued April 9, 1940.

What is claimed is:

1. A transmission comprising, a hydraulic torque transmitting unit, a gear chain connected thereto to be driven thereby, said gear chain including intermeshing gears encased to form a gear pump, an outlet connection for the gear pump, a manually controlled valve in said connection, and a pressure relief valve in said connection.

2. A transmission comprising a hydraulic torque converter, a gear chain connected to the torque converter to be driven thereby, said gear chain including intermeshing gears encased to form a gear pump, a connection from the gear pump to the torque converter for conducting liquid from the pump into the torque converter, means forming an outlet passage for liquid from the torque converter, and a throttling valve in said connection to cause the gear pump to act as a fluid brake resisting rotation of the torque converter.

3. A transmission comprising, a hydraulic torque converter, a gear set connected thereto to be driven thereby, said gear set including shiftable means for varying the driving relationship thereof and having intermeshing gears encased to form a gear pump, an outlet conduit for said gear pump connected to the torque converter to circulate liquid therethrough, and a throttling valve in said conduit to cause the gear pump to act as a brake to facilitate shifting of said shiftable means.

ADIEL Y. DODGE.